United States Patent [19]

Ebert et al.

[11] 4,431,078
[45] Feb. 14, 1984

[54] SNOWMOBILE SUSPENSION SYSTEM

[75] Inventors: Russell L. Ebert, Pequot Lakes, Minn.; Stanley G. Hayes, Horicon, Wis.

[73] Assignee: Deere & Company, Moline, Ill.

[21] Appl. No.: 194,596

[22] Filed: Oct. 6, 1980

[51] Int. Cl.[3] .................... B62B 17/04; B62M 27/02
[52] U.S. Cl. .................................................. 180/193
[58] Field of Search ........... 180/190, 192, 193, 9.24 A

[56] References Cited

U.S. PATENT DOCUMENTS

| 3,140,752 | 7/1964 | Feu | 180/192 |
|---|---|---|---|
| 3,148,743 | 9/1964 | Jarvi et al. | 180/192 |
| 3,664,446 | 5/1972 | Burtis et al. | 180/9.25 X |
| 3,835,947 | 9/1974 | Alexander, Jr. | 180/21 R |
| 3,913,692 | 10/1975 | Lohr et al. | 180/193 |
| 4,222,453 | 9/1980 | Fixson et al. | 180/193 |
| 4,342,372 | 8/1982 | Hayes | 280/25 X |

Primary Examiner—Joseph Paul Brust

[57] ABSTRACT

A snowmobile includes a pair of skis connected to the snowmobile frame by a forward suspension including a pair of telescopic struts which are biased to normally extended positions and are connected to a stabilizer member including a transverse torsion bar. A drive track of the snowmobile is suspended from the frame by a rear suspension, including a link pivotally connected between the frame, and a pair of slide rails and biased downwardly by a pair of torsion springs having respective ends engaged with a pivotally mounted spring end retainer which is connected to the torsion bar of the forward suspension by a pair of motion transfer links which act to "soften" the rear suspension in response to upward telescopic movement of one or the other or both of the telescopic struts.

6 Claims, 6 Drawing Figures

SNOWMOBILE SUSPENSION SYSTEM

BACKGROUND OF THE INVENTION

The present invention relates to suspension systems for snowmobile skis and drive tracks and more specifically relates to such suspension systems which include a stabilizer bar and telescopic strut assemblies for the skis.

Heretofore, suspension systems for snowmobiles have included front suspensions for the skis and separate rear suspensions for the tracks. An example of a front suspension, including a pair of telescopic struts, is disclosed in copending U.S. patent application, Ser. No. 140,730, filed by S. G. Hayes on April 16, 1980, which issued on Aug. 3, 1982 as U.S. Pat. No. 4,342,372. An example of a rear suspension is disclosed in U.S. Pat. No. 3,913,692, granted to Lohr et al on Oct. 21, 1975. While it is known to include stabilizer bars as portions of front suspensions for snowmobiles, such stabilizer bars have been used only in conjunction with front suspensions, including leaf springs attached lengthwise on the tops of the skis as disclosed, for example, in U.S. Pat. No. 3,835,947, granted to Alexander on Sept. 17, 1974.

SUMMARY OF THE INVENTION

According to the present invention, there is provided an improved suspension system for a snowmobile.

An object of the invention is to provide a suspension system comprising a front suspension, including a pair of telescopic struts connected to opposite ends of a stabilizer member.

A more specific object of the invention is to provide a front suspension, as set forth above, wherein the connection between the struts and the stabilizer member transfers telescopic movement of the strut to the stabilizer, but not steering movement.

Yet another object is to provide a suspension system where front and rear suspensions are interconnected such that the stiffness of the rear suspension is decreased in response to one or the other of the telescopic struts being compressed in response to load to thereby effect a more comfortable ride.

Another specific object is to provide interconnected front and rear suspension wherein the stabilizer bar of the front suspension is linked to a member for adjusting the torsional load in a pair of springs biasing a slide rail assembly against the upper suface of the lower row of a drive belt.

These and other objects will become apparent upon reading the ensuing description, together with the appended drawings.

DESCRIPTION OF THE PREFERRED EMBODIMENT

Figure 1:
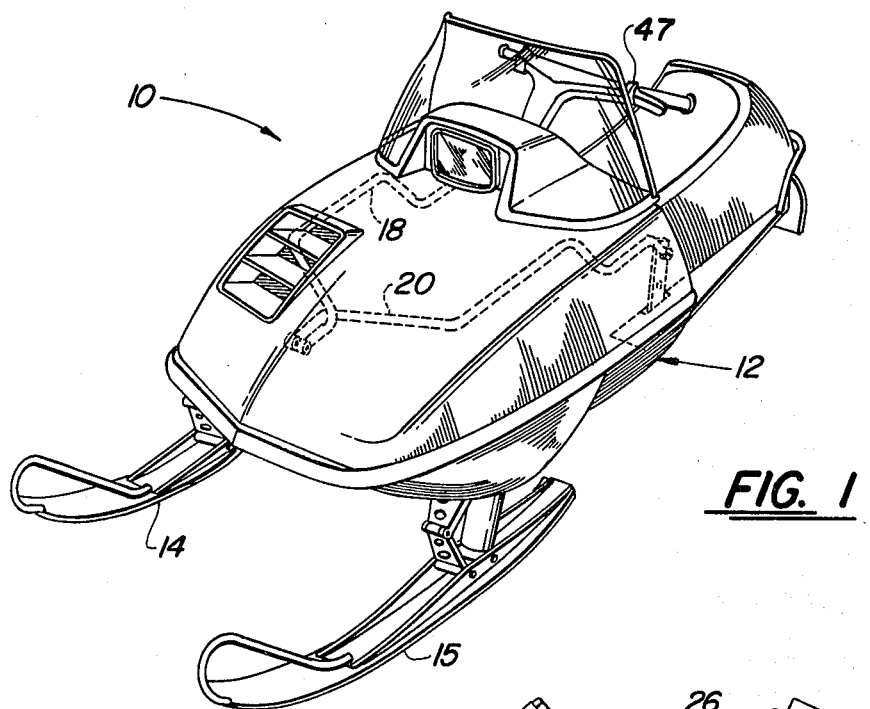
FIG. 1 is a left front perspective view of a snowmobile embodying a suspension system constructed in accordance with the principles of the present invention.
Figure 3:
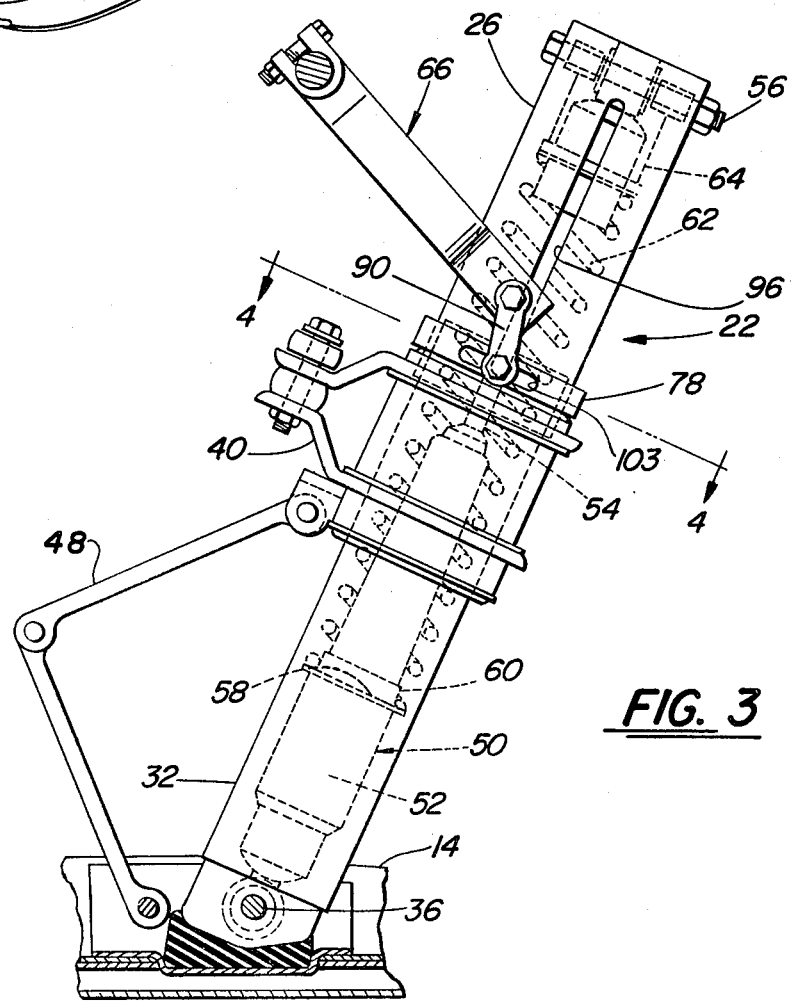
FIG. 3 is a left side elevational view of the left-hand telescopic strut.
Figure 2A:
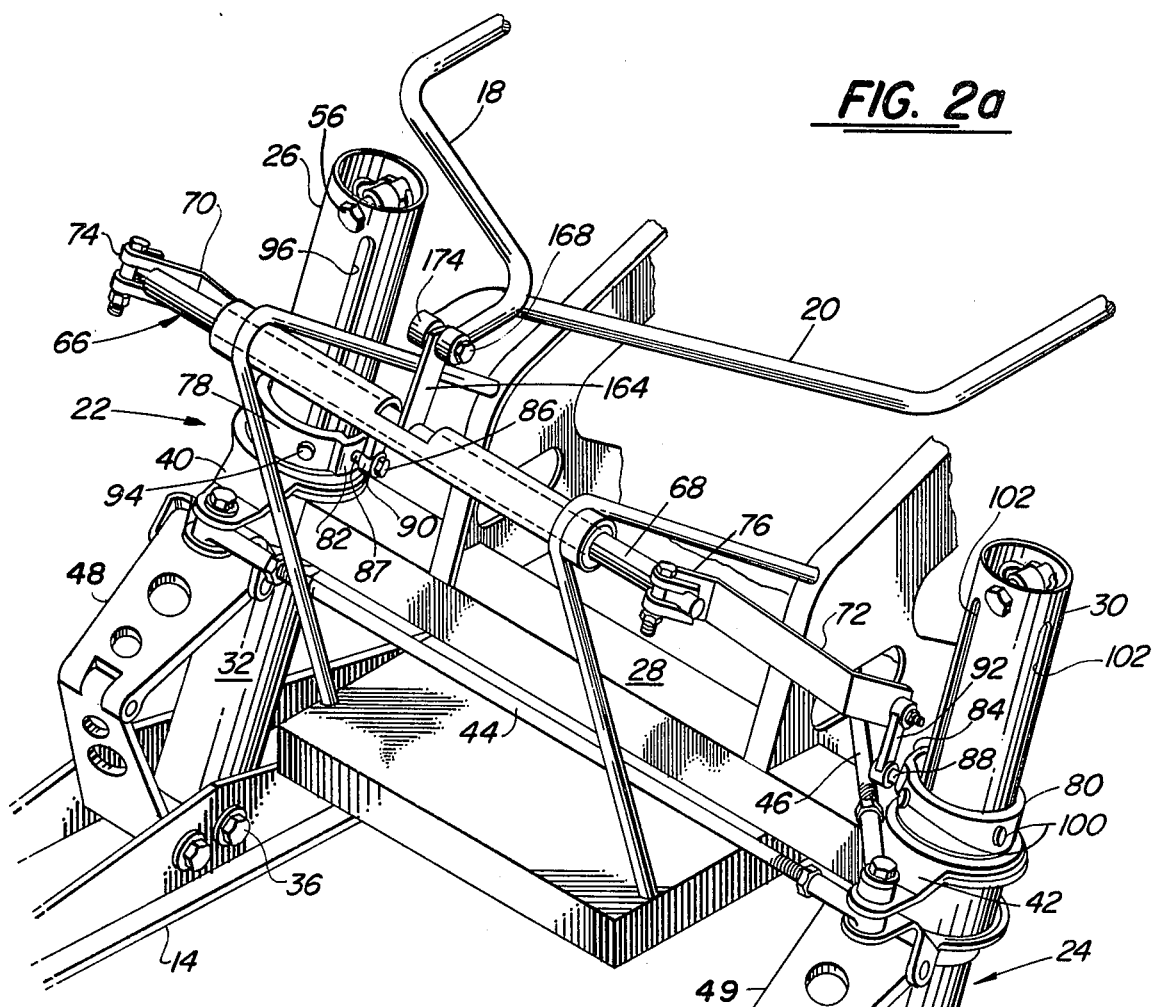
FIGS. 2A and 2B combine to form a left front perspective view of the front and pertinent portion of the rear suspension and illustrate the interconnection therebetween.
Figure 4:
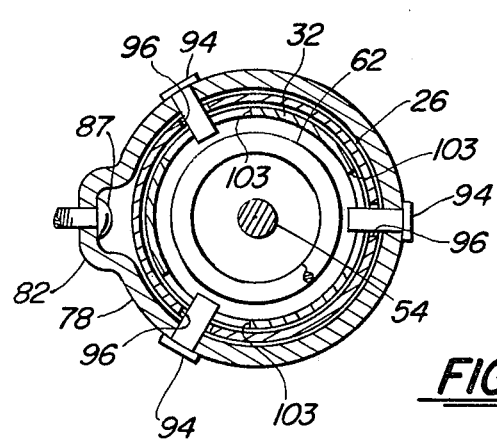
FIG. 4 is a sectional view taken along line 4—4 of FIG. 3.
Figure 2B:
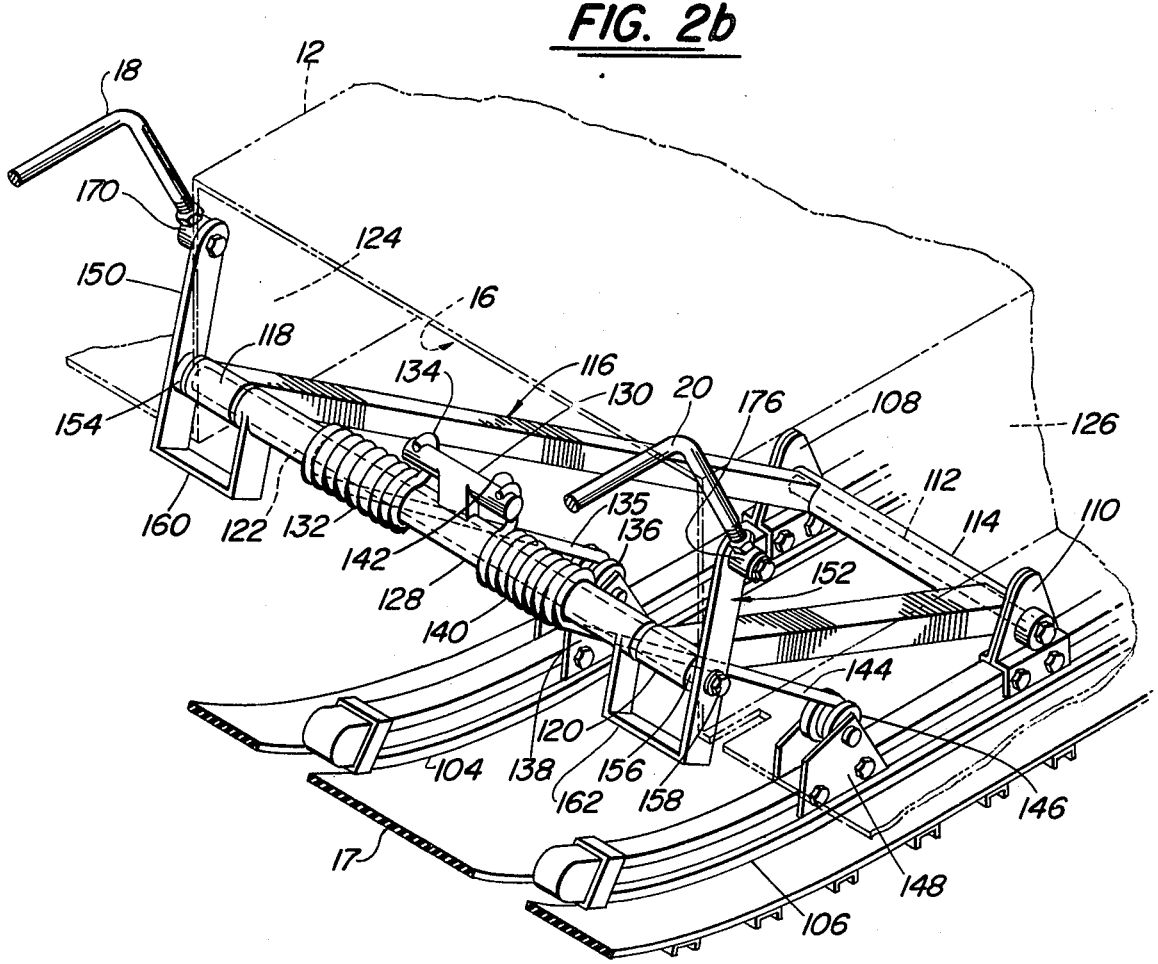
Figure 5:
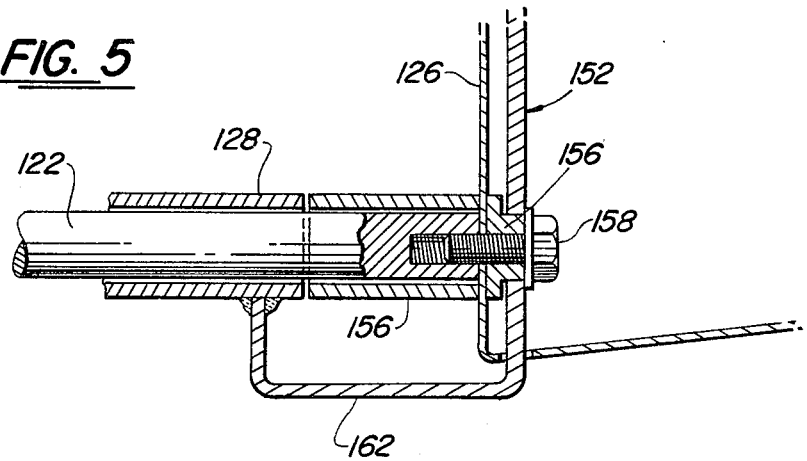
FIG. 5 is a sectional view showing a portion of the linkage for transferring certain front suspension movement of the rear suspension.

Referring now to FIG. 1, there is shown a snowmobile 10, including a main longitudinal frame 12, having right- and left-hand steerable skis 14 and 15, respectively, suspended from the forward end thereof by a front suspension and defining a longitudinal tunnel 16 (FIG. 2B) having a drive track 17 (FIG. 2B) disposed therein and suspended therefrom by a rear suspension. The front and rear suspensions will presently be described in more detail, together with right- and left-hand motion transfer rods 18 and 20 which act to "soften" the rear suspension in response to the front suspension being loaded in a manner described below.

Referring now to FIGS. 2 through 5, it can be seen that the skis 14 and 15 are respectively suspended from the frame 12 by right- and left-hand telescopic struts 22 and 24. The strut 22 includes an upright outer tube 26 fixed to the right-hand end of a transverse support member 28 forming part of the frame while the strut 24 includes an upright outer tube 30 fixed to the left-hand end of the member 28. Reciprocably and swivelly mounted in the outer tubes 26 and 30 are inner tubes 32 and 34, respectively, which have their lower ends respectively pivotally connected to the skis 14 and 15 by bolts 36 and 38.

Respectively swivelly mounted on the lower ends of the fixed outer tubes 26 and 30 are steering arms 40 and 42 having ears interconnected by a tie rod 44. A steering input rod 46 is also connected to the ear 42 and receives its input, as is conventional, from a steering post controlled by a set of handle bars 47 (FIG. 1). Connected between the steering arms 40 and 42 and the skis 14 and 15, respectively, are hinges 48 and 49 which serve to transfer steering motion to the skis while permitting the latter to reciprocate with the inner tubes 32 and 34.

Located within each of the struts 22 and 24 and acting to yieldably maintain them in normally extended conditions are identical spring and shock absorber assemblies which form part of a first biasing mechanism and of which only the right-hand one is illustrated and described in detail, for the sake of brevity. Thus, located within the right-hand strut 24 is an extensible and retractable shock absorber 50, including a cylinder 52, having an end received on the bolt 36 and including a rod 54 having an end fixed to the upper end of the fixed outer tube 26 by a bolt 56. The cylinder 52 has a stepped exterior forming an upwardly facing shoulder 58 against which an annular spring retainer 60 is seated. A coil compression spring 62 is compressed between the retainer 60 and an adjustment cam 64 engaged with the bolt 56.

Forming part of and acting to stabilize the front suspension, as when the snowmobile is travelling over moguls or being steered, is a stabilizer assembly including stabilizer member 66. The stabilizer member 66 is formed, in part, by a transverse torsion bar 68, rotatably supported on the frame 12 between and forwardly of the struts 22 and 24. The stabilizer member 66 further includes right- and left-hand straps 70 and 72 having forward ends respectively fixed, as at 74 and 76, to the right- and left-hand ends of the torsion bar 68. Reciprocably mounted on the outer tubes 26 and 30 are sleeves or collars 78 and 80, respectively, which are provided with inwardly projecting, offset portions 82 and 84 forming pockets for providing clearance between the tubes 26 and 30 and the heads of bolts 86 and 88 that project radially through the sleeves relative to respective longitudinal axes of the struts 22 and 24. Right- and left-hand motion transfer links 90 and 92 have respective ball joints at their upper ends connected to rear or trailing ends of the straps 70 and 72 and respective ball joints at their lower ends received on the bolts 86 and 88. Arranged equiangularly in the sleeve 78 are three radially inwardly projecting pins 94 which are respectively received in three longitudinally extending slots 96 located in the outer tube 26. Overlapping and respectively extending crosswise to the slots 96 are three slots 103 located in the upper end of the inner tube 32. The inner ends of the three pins 94 are respectively received in the three slots of the inner tube 32. Similarly arranged equiangularly in the sleeve 80 are three radially inwardly projecting pins 100 respectively received in three long slots 102 arranged longitudinally in the outer tube 30. The inner tube 34 is provided with three slots (not shown) which extend crosswise to and overlap the three slots 102 and the pins 100 project thereinto.

Thus, it will be appreciated that the sleeves 78 and 80 will reciprocate with the inner tubes 32 and 34 due to the engagement of the latter with the pins 94 and 100, but that the sleeves will not move when the inner tubes 32 and 34 swivel due to the presence of the slots located in the upper ends of the tubes 32 and 34. Accordingly, when one or the other of the skis 14 and 16 is loaded so as to cause the respective strut to retract, the motion of the retracting strut will be transferred to the torsion bar 68 by means of the associated one of the sleeves 78 and 80, the links 90 and 92 and the straps 70 and 72 and will act to tend to cause a similar retraction of the unloaded ski to thereby stabilize the snowmobile 10.

This collapsing motion of one or the other of the struts 22 and 24 is also transferred to the rear suspension of the snowmobile. Specifically, as can best be seen in FIGS. 2B and 5, the rear suspension includes right- and left-hand slide rails 104 and 106 which normally bear against the upper surface of the lower run of an endless belt forming the drive track 17. Respectively fixed to the rails 104 and 106 are a first pair of brackets 108 and 110 in which are received the opposite ends of a transverse pivot rod 112. Pivotally received on the rod 112 is a tubular member 114 forming part of a U-shaped link 116 having its opposite legs provided with forward tubular ends 118 and 120, respectively, pivotally mounted on a second transverse pivot rod 122 having its opposite ends secured to opposite right- and left-hand walls 124 and 126 of the tunnel 16 formed by the frame 12. A second biasing mechanism acts to yieldably resist movement of the slide rails 104 and 106, and hence the drive belt 17 towards the frame 12. Specifically, received on the pivot rod 122 inwardly of the link 116 is a tube 128 having a T-shaped spring-end retainer 130 fixed thereto. A right-hand torsion spring 132 has a series of coils received on the tube 128 and has one end formed into a hook 134 engaged with the retainer 130 and a straight second end 135 slidably engaged with a spool-like guide 136 mounted on the right-hand rail 104 by a bracket 138. Similarly, a left-hand torsion spring 140 has a series of coils received on the tube 128 and has one end formed into a hook 142 engaged with the retainer 130 and a straight second end 144 engaged with a spool-like guide 146 mounted on the left-hand rail 106 by a bracket 148. The windings of the springs 132 and 140 are such that they tend to exert a force biasing the rails downwardly away from the frame 12 against the lower run of the drive track 17.

Right- and left-hand levers 150 and 152, respectively, are pivotally received on bushings 154 and 156 secured to the right- and left-hand ends of the pivot rod 122 by cap screws 158 (only the left one is visible). The lower ends of the levers 150 and 152 respectively include inwardly projecting legs 160 and 162 which terminate in upturned ends that are fixed, as by weldments, to the tube 128.

Fixed to the torsion bar 68 of the front suspension, at a location intermediate of its opposite ends, is an upstanding lever arm 164. The right-hand motion transfer link 18 has its forward end pivotally connected, as at 168, to the upper end of the lever arm 164 and has its rearward end pivotally connected, as at 170, to the upper end of the right-hand lever 150. Similarly, the left-hand motion transfer link 20 has its forward end pivotally connected, as at 174, to the upper end of the lever arm 164 and has its rearward end pivotally connected, as at 176, to the upper end of the left-hand lever 152.

Thus, it will be appreciated that upward movement of one or the other of the skis 14 and 16 will affect forward movement of the lever arm 164 and, consequently, forward movement of the levers 150 and 152, which results in the spring-end retainer 130 moving forwardly to permit the springs 132 and 140 to unwind so as to affect a "softening" of the rear suspension in anticipation of whatever moguls or obstacles which initially caused the upward ski movement.

The operation of the snowmobile suspension is thought to be clearly evident from the foregoing description and, for the sake of brevity, no further description of the operation is given.

We claim:

1. In a snowmobile, including a frame, a front suspension suspending a pair of skis from the front of the frame for moving up and down relative to the frame and a rear suspension suspending a drive track beneath a rear portion of the frame for moving up and down relative to the frame, the front and rear suspensions respectively including a front pair of members which move up and down in concert with the skis and a rear member which moves up and down in concert with the drive track, and first and second biasing mechanisms, respectively acting between the frame and the front pair of members and the rear member to bias the front and rear members downwardly relative to the frame, the improvement wherein the second biasing mechanism includes an element mounted for movement in a first direction for decreasing the resistance of the second biasing mechanism to upward track movement as the displacement of the element in the first direction increases, and a motion transfer linkage means, connected between the front pair of members and the element, for transferring upward movement of the front pair of members to the element for moving the latter in the first direction to thereby decrease the resistance of the second biasing mechanism of the rear suspension to upward track movement.

2. In a snowmobile, including a longitudinally extending main frame, a pair of skis, each respectively mounted on the frame by a telescopic suspension, comprising a first upright tube fixed to the frame and a second tube reciprocably and swivelly mounted in the first tube and having a lower end connected to one of the skis, and a rear suspension suspending a drive track beneath a rear portion of the frame for resisting upward movement of the track relative to the frame comprising at least one member having one end pivotally mounted on the frame and a torsion spring connected between the frame and the member and including an adjustably fixed free end movable in opposite first and second directions to respectively increase and decrease resistance to the one member moving toward the frame, the improvement comprising: linkage means connected between the second tubes and the free end of the torsion spring for moving the latter in the second direction in response to the second tubes moving upwardly within the first tubes to thereby soften the rear suspension in anticipation of engaging whatever caused upward movement of the second tubes.

3. In a snowmobile having a frame, a pair of skis suspended from the front of the frame by a front suspension including a pair of upright struts, each including an outer tube fixed to the frame an inner tube telescopically and rotatably mounted in the outer tube, a shock absorber and spring assembly mounted between the frame and each of the inner tubes and including a spring biasing the inner tubes toward a normally extended condition, a drive track suspended from a rearward portion of the frame by a track suspension including a track engaging assembly, a link assembly connecting the track engaging assembly to the frame, and a torsion spring assembly connected between the track engaging assembly and the frame and acting to bias the track engaging assembly away from the frame, the improvement comprising: said torsion spring assembly having adjustable end means mounted for movement in a first direction from a preselected normal position for effecting decreasing torsional load in the spring; and a stabilizer linkage means mounted between the front suspension and the adjustable end means for effecting movement of the latter in said first direction in response to upward telescopic movement of the inner tubes of the struts to thereby soften the rear suspension in anticipation of a bump which is being encountered by the skis.

4. The snowmobile defined in claim 1 wherein the motion transfer means includes a stabilizer bar rotatably supported on the frame in horizontal, transverse relationship adjacent the pair of skis and further includes a pair of first linkage sections respectively connected between the opposite ends of the stabilizer bar and the pair of front members and a second linkage section connected between the stabilizer bar and element of the second biasing mechanism.

5. The snowmobile defined in claim 2 wherein the linkage means includes a sleeve reciprocably mounted on each first tube and a lost motion connection means connecting the sleeve to an adjacent second tube for reciprocable but not swivel movement with the latter.

6. The snowmobile defined in claim 5 wherein each sleeve has at least one pin fixed thereto; at least one slot extending lengthwise in each first tube; at least one slot in each second tube extending crosswise to and overlapping the one slot in an adjacent first tube; and the pin being received in both the one slot in the first tube and the one slot in the second tube.

* * * * *